United States Patent [19]

Kronstadt

[11] 4,335,623
[45] Jun. 22, 1982

[54] TRANSMISSION SHIFT CONTROL MECHANISM

[75] Inventor: Victor Kronstadt, Hagerstown, Md.

[73] Assignee: Mack Trucks, Inc., Allentown, Pa.

[21] Appl. No.: 128,171

[22] Filed: Mar. 7, 1980

[51] Int. Cl.³ .......................... G05G 5/10; G05G 9/12
[52] U.S. Cl. .................................. 74/477; 74/473 R; 74/475
[58] Field of Search ....................... 74/473 R, 475, 477

[56] References Cited

U.S. PATENT DOCUMENTS

| | | | |
|---|---|---|---|
| 3,015,968 | 1/1962 | Szekely | 74/477 |
| 3,264,893 | 8/1966 | Stott et al. | 74/477 |
| 3,264,895 | 8/1966 | Turunen | 74/477 |
| 3,274,842 | 9/1966 | Huff | 74/477 X |
| 3,431,791 | 3/1969 | Labat | 74/473 R |
| 3,468,180 | 9/1969 | Mays et al. | 74/475 |
| 3,513,717 | 5/1970 | Lickey et al. | 74/477 |
| 3,554,047 | 3/1969 | Stott | 74/477 |
| 3,857,299 | 12/1974 | Morrison | 74/473 R |
| 4,132,125 | 1/1979 | Janiszewski | 74/477 |

Primary Examiner—Allan D. Herrmann
Attorney, Agent, or Firm—Bernard, Rothwell & Brown

[57] ABSTRACT

A mechanical shift control system, for use on manual transmissions, employing a number of shifter forks mounted on a single stationary rail. The shifter forks engage sleeves, clutches or other similar elements of a transmission to shift the transmission between selected gear shift ratios. A set of stacked levers movable in parallel planes drive respective gear shift forks reciprocally along the stationary rail. For actuation of a lever, a selector shaft is employed extending in a plane perpendicular to the movement of the levers. The selector shaft reciprocates laterally through the various planes of lever movement to positions corresponding to a particular lever actuation and rotates in each plane to move a selected lever in a direction corresponding to a selected gear ratio.

18 Claims, 6 Drawing Figures

TRANSMISSION SHIFT CONTROL MECHANISM

BACKGROUND AND DISCUSSION OF THE INVENTION

In gear shift control mechanisms, there is typically a jaw clutch which moves between two positions corresponding to two different gear ratios of the transmission. Shifter forks are provided for actuation by a shifting mechanism to move the jaw clutches to the desired position and activate the various gear ratios. Where there are a plurality of gear ratios involved, a number of systems have included a separate shift rail for each shifter fork. The rail is free to move axially with its supports, and each rail has a separate shifter with slots into which a shift finger or lever can be accepted. By appropriate selection of each shifter by the finger and subsequent fore or aft movement, the various transmission jaw clutches can be engaged. Each rail is detented at three positions, the neutral position and a position corresponding to each different gear ratio on either side of the neutral position.

With this system, a bell-crank arrangement may be needed for providing a progressive shift pattern. A problem with this system is the large number of parts required to change gear ratios, as well as, maintain acceptable tolerances during a shifting operation. The invention described herein obviates the need for the large number of parts which has characterized prior systems as discussed above and as a result eliminates the accompanying tolerance problems. In addition, the invention provides for a minimum shifting schedule which, in addition to reducing the tolerance problem, enhances the feel and acceptability to the operator.

Specifically, as will be pointed out in more detail in the description of the preferred embodiment, the invention disclosed herein includes a stationary rail on which shifter forks are moveable fore and aft as a result of rotative actuation of a selector shaft. Intermediate the selector shaft and the shifter fork there is a mechanism including a series of cams and levers for transposing the rotative motion of the selector shaft to the linear motion needed for movement of the shifter forks along the single stationary rail. Once a cam and lever is selected by movement of the selector shaft along its longitudinal axis, the selector shaft is then rotated whereby the cam, lever mechanism drives the shifter fork along the stationary rail in one direction or the other to achieve the desired gear ratio. By using a stacked system with the apparatus described above, minimum shift schedule is achieved and high tolerances can be maintained.

In addition to having a relatively small number of parts, this mechanism can use stamped components requiring little or no subsequent machining in place of presently utilized forgings. This results in a compact, reduced weight mechanism having low inertia and improved "feel". The single rail requires less clearance between main or counter shaft gears. On transmissions of the multi-counter shaft variety this compactness is significant because it places the shifter forks closer to the output or mainshaft resulting in shorter forks which will be less prone to wearproducing deflections. Manufacturing efficiencies are gained by not having to provide multiple, bearing quality alignments or fits between the rails and supports.

Although there have been previous attempts to employ a single rail for a number of shifter forks, these have not achieved the attributes attendant the construction and mode of operation of the invention described herein. Consequently, these other single rail devices suffer from disadvantages in tolerances, shifting schedule, versatility and operator feel, which the instant invention has overcome.

An example of a single rail construction, over which the invention described herein has improved, is shown in U.S. Pat. No. 3,544,047 to Stott (hereinafter referred to as Stott). Stott relates to a selector mechanism having the striker forks slideably mounted on a single striker shaft where, according to the patentee, the striker members can be grouped more closely together. The selector mechanism may also include an interlock portion to prevent movement of striker members other than the selected one. The selector shaft is mounted for rotary movement about a longitudinal axis, as well as for movement in the longitudinal direction. A longitudinal blade-like extension has first and second selector portions in the form of recesses circumferentially spaced around the selector shaft to engage selected striker forks. In operation a gear shift lever is actuated to effect rotary movement of the selector shaft and bring these selector portions in alignment with corresponding selector portions on the striker members. The gear shift lever is subsequently operated to produce longitudinal movement of the selector shaft thereby moving the selected striker member, engaged by its respective selector portion, through a change in gear ratio selection.

The Stott configuration cannot obtain the minimum shift schedule or the high tolerance of the cam and lever mechanism of the present invention. In addition there is also a certain versatility achieved by this invention which was not obtained by devices such as those shown by Stott. This versatility is the ability to maintain a progressive shift pattern for the operator with various arrangements of the gears. For example, the alignment of the gears and the shifting forks may be such that the shifting between ratios results in a shift pattern or schedule that is not progressive. By this, it is meant that the shift from first to second may be in one direction, but the shift from third to fourth may be in the opposite direction. This produces an awkward movement for the operator and often results in additional mechanisms being needed in the transmission to obtain the more acceptable progressive shift schedule. However, with the cam, lever systems of the invention described herein by simply reversing the cam arrangement, a progressive shift schedule can be achieved regardless of the position of the gears or forks employed. For that matter, any pattern desired, such as might be required when using the same transmission in both left and right hand drive vehicles, can be obtained with minimum parts substitution.

An interlock mechanism is also provided in the present invention to prevent inadvertent selection of more than one gear ratio at a time. The interlock mechanism cooperates with the selector shaft to engage a selected cam upon movement of the selector shaft and thereby prevent actuation of non-selected levers during actuation of the selected lever. The mechanism is detented on the selector shaft to give the operator feel of the shift lever for each gear position. The mechanism is detented at the input in both the transverse and axial planes of the selector shaft to maximize "operator feel" at minimum expense, and avoid putting loads into the downstream components.

With the configuration of the invention described herein, the selector shaft can be brought out to either side of the transmission. Thus, left or right hand drive vehicles of either the conventional or COE configuration can readily be accommodated. Transverse placement of the shaft permits the use of actuating rods having minimum bends when utilized on the latter vehicles for remote control of shifting. Furthermore, placement of the selector shaft can be made with appropriate design modifications, in various desired planes and positions that may be deemed advantageous. For instance, the selector shaft could be placed in a vertical plane and the balance of the mechanism altered accordingly. Other advantages will become apparent from the detailed description of the preferred embodiment.

SUMMARY OF THE INVENTION

Generally, the invention relates to an apparatus for selecting various gear ratios of a transmission where a plurality of shifter forks are mounted on a single stationary rail. A plurality of levers are arranged such that each lever engages a corresponding shifter fork for moving the forks along the rail. A plurality of cams are mounted to engage a corresponding one of the levers. A selector shaft is mounted for lateral movement along its longitudinal axis and rotative movement about its longitudinal axis for selectively engaging one of said cams and for moving the selected cam to effect movement of a corresponding lever and ultimately a shifter fork and its associated gear. Details of the invention are discussed below.

DETAILED DESCRIPTION OF THE PREFERRED EMBODIMENT

Figure 1:
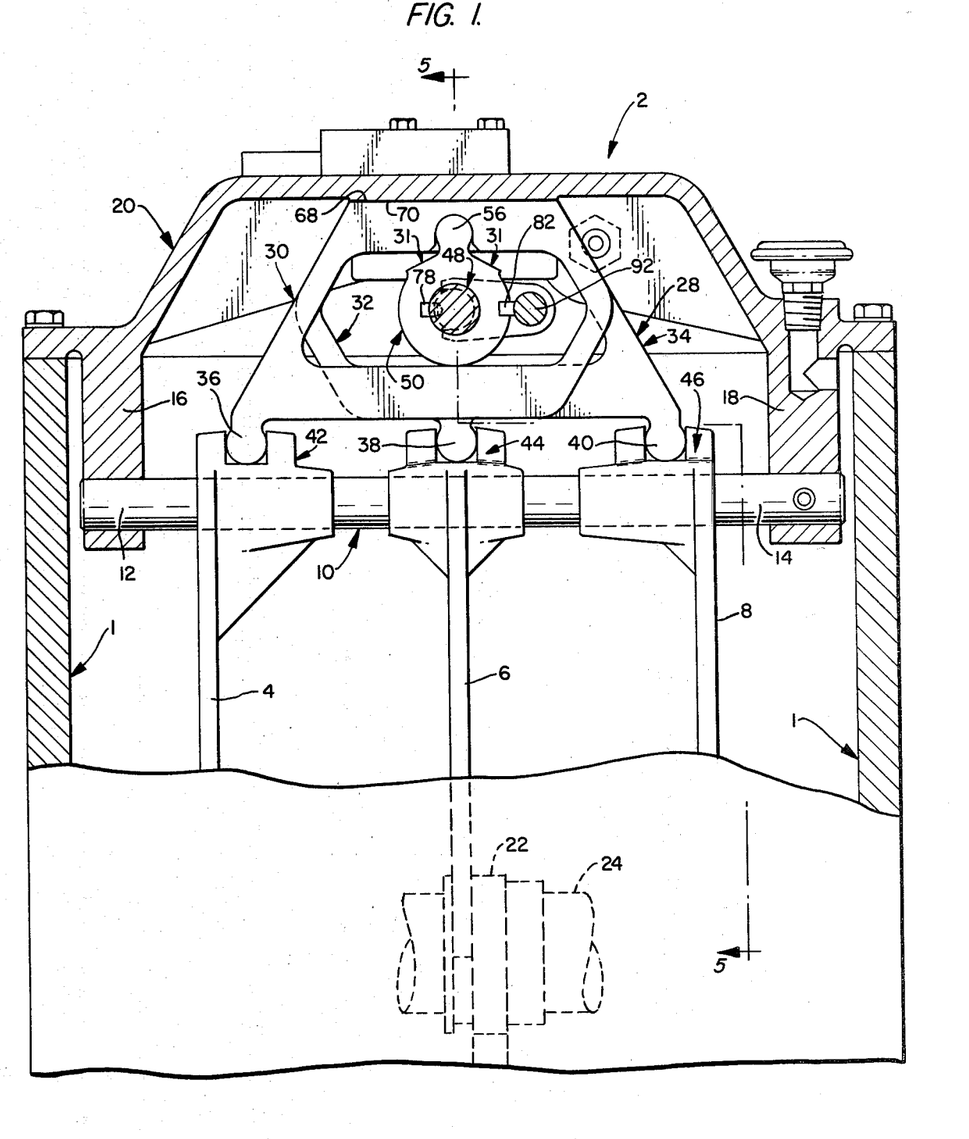
FIG. 1 shows a side view with a partial cross-section along 1—1 of FIG. 2, of a five-speed vehicle gear box showing an embodiment of a shifting mechanism according to the invention.
Figure 2:
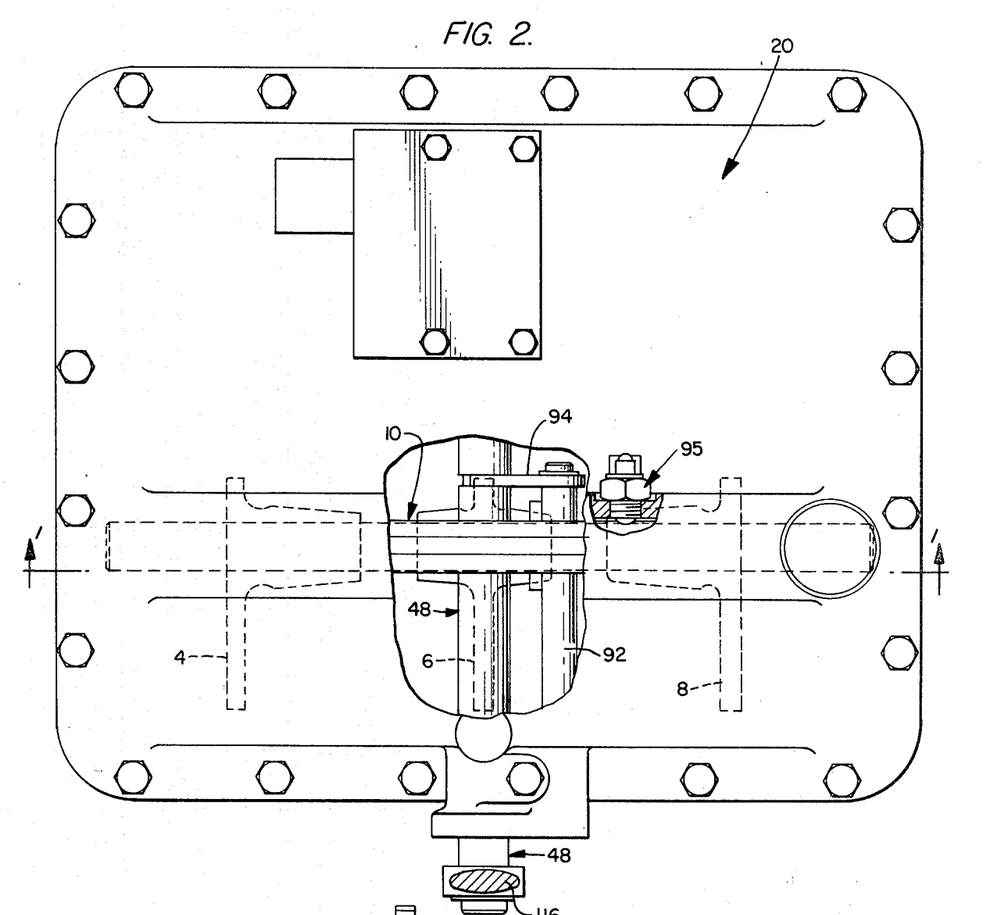
FIG. 2 is a top view of the shifting mechanism in FIG. 1 with a partial cutaway exposing portions of the selector mechanism.

In general, shift control mechanisms are employed in vehicle transmission systems to shift clutches or other gears between gear ratios. As shown in FIG. 1, the shift control mechanism 2 includes three shifter forks 4, 6, 8, arranged on a stationary rail 10 for movement along the longitudinal axis of the rail. Stationary rail 10 includes end portions 12, 14 fixed to respective flange portions 16, 18 of a top cover 20 used to cover housing 1. As shown in phantom lines in the lower center of housing 1, an externally-toothed jaw clutch 22 splined to shaft 24 for sliding movement along shaft 24 between two gears (not shown) in a manner well known to those skilled in the art. As shown, movement of the clutch 22 to the right engages a gear with the shaft 24 and thereby imparts one gear ratio to the transmission output. Similarly, movement of the clutch to the left engages another gear and imparts a different gear ratio to the shaft output. Each of the forks 4, 6, 8 operates in a similar manner to impart different gear ratios to the output shaft when actuated in the manner described with respect to clutch 22.

Figure 3:
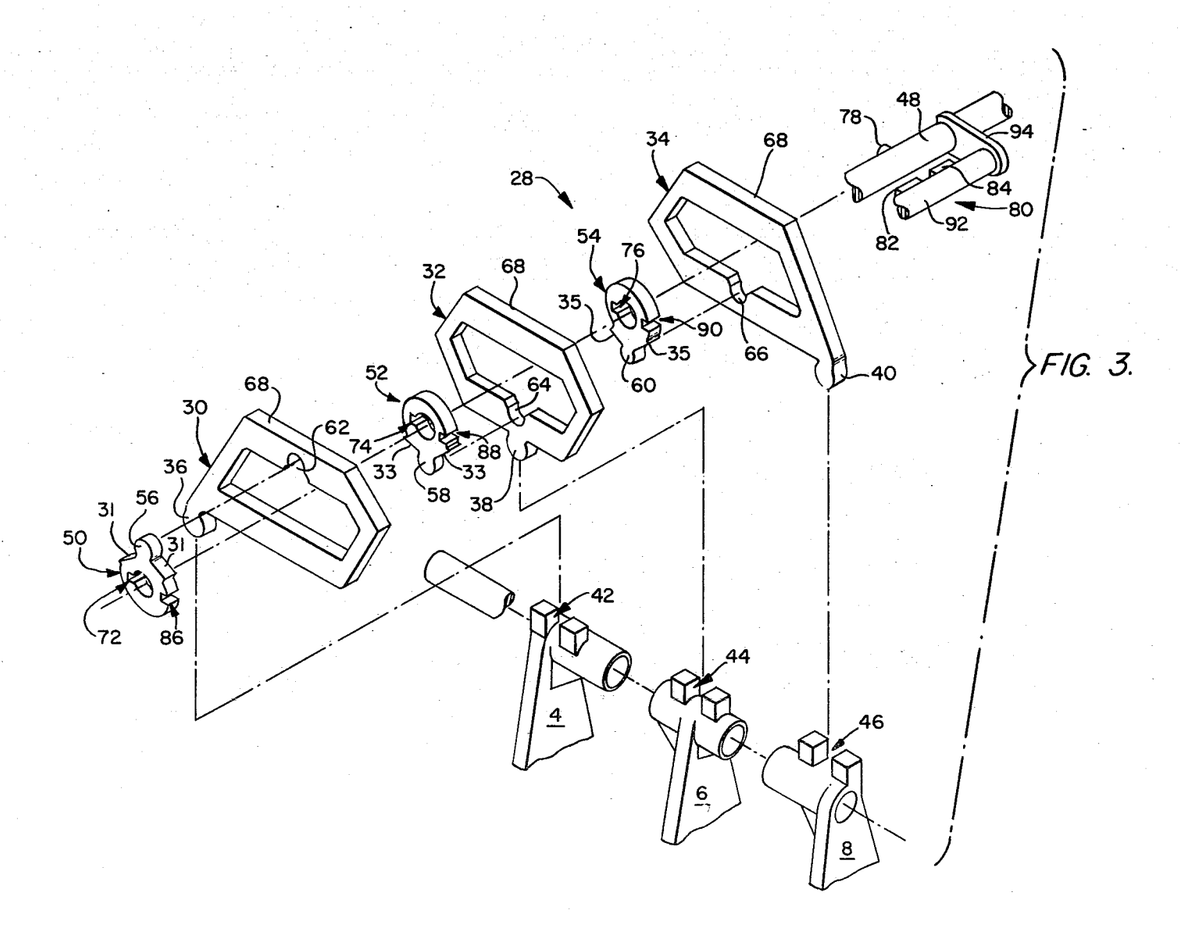
FIG. 3 is an exploded perspective view of the lever, cam and selector shaft mechanism shown in FIGS. 1 and 2.

As can be seen in FIG. 3, an internal shift control subassembly 28 includes first, second and third levers 30, 32, and 34 for engaging shifter forks 4, 6, 8, respectively, and moving the shifter forks along stationary rail 10 to achieve a selected gear ratio including reverse which may or may not be the same ratio as the first gear ratio. The levers 30, 32 and 34 include engaging portions or male lever elements 36, 38, 40, respectively, for engaging the female elements 42, 44, 46, respectively, on the shifter forks such that linear movement of a lever results in corresponding linear movement of its shifter fork. Selector shaft 48 extends along a longitudinal axis, which is perpendicular to the plane of movement of the levers, for rotative and reciprocal movement of shaft 48. For this purpose one end of selector shaft 48 is journalled in block 96 and the other end in support structure 97 of shift valve 79.

Shift valve 79 is part of an auxiliary, shift system, such as a high-low range system, which actuates an interlock to prevent operation of this auxiliary system when selector shaft 48 is in a position other than neutral, but to permit operation when selector shaft 48 is in the neutral position as shown. Although shift valve 79 forms part of the support structure shown in the Figures, any convenient support structure could be employed as long as it provides for longitudinal and rotative movement.

A series of cams 50, 52, 54 circumscribing selector shaft 48 are configured and arranged to cooperate with levers 30, 32, 34, respectively, to move them reciprocally upon rotative motion imparted to the cams by a similar motion of selector shaft 48. The levers are plate-like in configuration with a center portion removed to define a cavity for accommodating rotative movement of cams 50, 52, 54, selector shaft 48, and other elements employed for actuation of the levers. The cams 50, 52, 54, include knob members 56, 58, 60, respectively, for engaging complementary cam surfaces 62, 64, 66, respectively, formed in internal surfaces defining the lever cavity. Each lever defines an upper edge 68 for engaging cover top surface 70 such that rotative motion of cams 50, 52, 54 reacting with the levers results in a linear reciprocal movement of the levers. This occurs because the interaction of lever upper edge 68 with cover top surface 70 prevents rotative movement of the levers 30, 32, and 34.

As described above, the apparatus provides for movement of a given shift fork as a function of the cam chosen by reciprocal movement of the selector shaft. Shaft 48 is moved linearly along the longitudinal axis to engage a particular cam element and move the lever and ultimately the shift fork between desired gear shift ratio positions. Upon selection of a cam, selector shaft 48 is rotated about its longitudinal axis to move the shifter fork in one direction or the other depending on the gear ratio desired.

For achieving this selection function, the cams on their internal surfaces define cam internal slots 72, 74, 76 which extend radially into the cams 50, 52, 54 respectively. A selector shaft pin 78 is fixed to the selector shaft and also extends radially therefrom, for extension into the slots defined by the cam surfaces and engagement by the walls of each slot, such that rotative motion of selector shaft 48 causes the selector shaft pin 78 to engage the walls of the slot and move the selected cam member in the same rotative direction as that of selector shaft 48.

An interlock mechanism 80 is provided to insure that the remaining cams not selected are prevented from movement during rotation or actuation of the selected cam. In this embodiment, the interlock mechanisms 80 includes two male keys 82, 84 spaced from one another a distance slightly greater than the width of any cam member. Cams 50, 52, 54 define, in addition to the internal slots discussed above, external cam slots 86, 88, 90 for engagement by the male keys 82, 84 mounted on interlock shaft 92. The interlock shaft is mounted on shaft 48 to move reciprocatively, but not rotatively, with the latter shaft. The male keys are arranged for linear reciprocal movement with interlock shaft 92 and, therefore, with selector shaft 48 to various positions of cam selection and for cam rotative movement such that the space between male keys 82, 84 registers with the selected cam while one or both of the keys 82, 84 are engaged with the remaining two cams and prevent their being moved during rotation of selector shaft 48.

Figure 4:
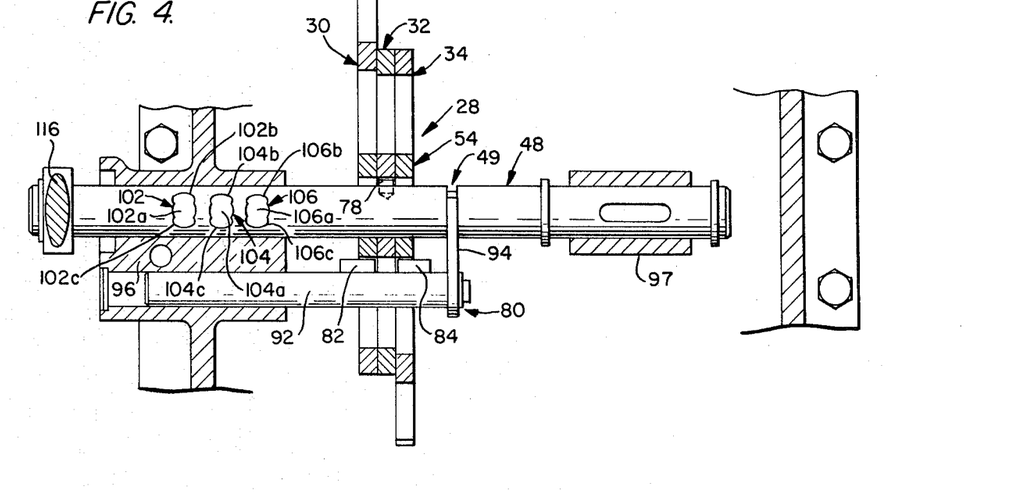
FIG. 4 is a top view of the selector shaft mechanism with a portion of the housing removed as shown in FIG. 2.

Specifically, as can be seen in FIG. 4, male keys 82, 84 are mounted on interlock shaft 92 which has one end journalled in block 92 and the other end mounted on selector shaft 48 by a connector arm 94. And as shown in FIG. 4, selector shaft 48 is in a position where cam 52 is engaged by selector pin 78, male keys 82, 84 extend into external cam slots 86, 90 of cams 50, 54 to prevent rotative movement of the latter. Each key 82, 84 has a width slightly less than the combined width of any two cams. With this configuration, when the selector shaft 48 is moved to a position where the first or third cam is engaged by pin 78, one of the male keys 82, 84 will be in engagement with both of the non-selected cams to prevent their movement.

Although rigidly fixed to interlock shaft 92, connector arm 94 is secured, with respect to selector shaft 48, for relative rotative movement, but fixed for reciprocal or longitudinal movement. One end of connector arm 94 has a fork-like configuration for engaging an annular recess 49 in selector shaft 48. Preferably, shaft 92 can be provided with flat side for engagement with a complementary flat surface of arm 94 to prevent rotative movement. Alternatively, a pin is fixed to block 96 for engagement with a slot in the interlock shaft 92 to constrain the latter from rotative movement. The slot would have a sufficient length to permit desired longitudinal movement of shaft 92. However, any convenient means may be employed to constrain rotative motion while providing for reciprocal motion.

Thus, when selector shaft 48 is reciprocated laterally to one of the three positions shown for achieving a shift, the interlock shaft 92 will move similarly in the lateral direction to register the gap between keys 82, 84 with a given selected cam. However, once a position is chosen and selector shaft 48 rotated, interlock shaft 94 will be constrained from rotative motion and, through the operation of keys 82, 84 with slots 86, 88, 90, prevent movement of the non-selected cams.

Figures 5, 6:
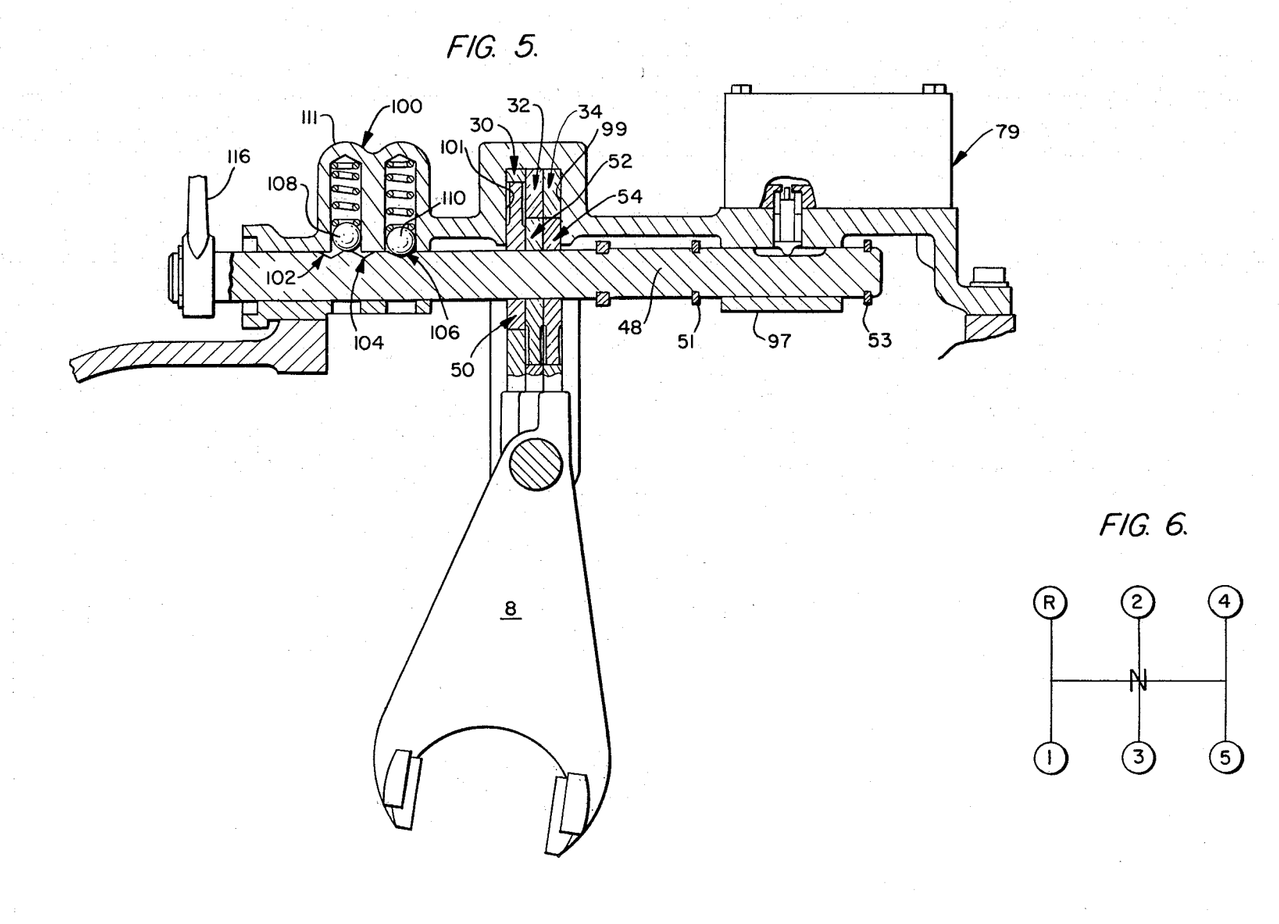
FIG. 5 is a side view of the mechanism shown in FIG. 4.
FIG. 6 is a schematic of the progressive shift pattern for which the shifting mechanism can be used.

As can be seen in FIG. 5, the housing is configured to maintain the levers and cams in their stacked, position even during longitudinal movement of selector shaft 48. Two, spaced-apart vertical faces 99, 101, extending parallel to the path of cam and lever movement and perpendicular to selector shaft axit, are provided in the housing to engage flat surfaces of levers 30, 34 and their respective cams 50, 54. In this manner, the vertical faces 99, 101, which are flat surfaces, prevent longitudinal movement of the levers and cams during the reciprocal movement of the selector shaft in a shifting operation. However, these vertical faces 99, 101 are spaced apart sufficiently to allow movement of the levers and the cams in planes perpendicular to the selector shaft axis.

A detent mechanism 100 is provided to yield a feel to the operator when shifting from one position to another during the shifting operation and bias selector shaft 48 into the position selected. For this purpose, there are included three sets of recesses 102, 104, 106 spaced longitudinally from one another along the axis of reciprocation for selector shaft 48, as best can be seen in FIG. 4. Each set has three recesses identified by subscripts, a, b and c where each recess has an effective center, spaced peripherally from the others about the upper surface of the selector shaft on a line corresponding to the direction of selector shaft rotation. The center recesses, 102a, 104a and 106a correspond to neutral positions between gear ratios while the recesses 102c and 102b, 104c and 104b, 106c and 106b on either side of 102a, 104a and 106a correspond to different gear ratios which can be selected upon rotation of selector shaft 48 out of the neutral position and through an arc equal to the displacement of these recesses on either side of the neutral position. From FIG. 5, it can be seen that a set of bearing members or roller balls 108, 110 are biased by helical spring members toward the sets of recesses 102, 104 and 146. Two setw of balls are employed where their centers are spaced from one another a distance greater than the space between centers of any two adjacent sets of recesses 102, 104, 106. In this manner when one ball is moved into one of the recesses of a set indicating a gear shift ratio position or neutral position, the other ball rides on the surface of the selector shaft between the remaining two sets of recesses; or, when the center set is engaged by one ball, the other ball rides on the surface of the shaft at either end of the sets of recesses. This ball and spring mechanism is enclosed in a houing member 111 extending upwardly from block 96 in which the selector shaft as well as the interlock shaft 92 are journalled.

In addition to the detent mechanism discussed above mechanical stops are employed to limit travel and force input. As can be seen in FIG. 5, snap rings 51, 53 on selector shaft 48 are located on either side of support structure 97 to limit travel. Rotation of the cams is limited by flats on cam surfaces adjacent the knobs. Thus, the cams 50, 52, 54 have a respective set of flats 31, 33, 35, one on either side of corresponding knobs 56, 58, 60, which cooperate with internal surfaces of the levers 30, 32, 34 to prevent rotation of selector shaft 48 beyond a predetermined arc.

Although an automatic or hydraulic system can be used to actuate the shift lever mechanism as discussed above, the system employed in the preferred embodiment is operated through a manual shifting lever 116. Lever 116 is connected to appropriate linkages which terminate in the cab and has an end exposed for grasping and shifting by the operator.

A feature of the above arrangement includes an ability to maintain a progressive shift pattern as shown in FIG. 6 regardless of the arrangement of gears and concommitant direction of movement required by the shifter forks to achieve the change of gear ratio. For example, the gear clutches may be arranged in such a manner that, contrary to the pattern shown in FIG. 6, the second and third gear ratio positions would be reversed avoiding a progressive shift pattern. But this problem is easily overcome by the cam lever arrangement discussed above.

For the purpose of explanation, in connection with FIGS. 3 and 6 assume positions 2 and 3 are reversed. Rotation of the selector shaft 48 in a clockwise direction from the neutral position, where cam member 52 is engaged by pin 78, lever 32 will be moved forwardly, toward shifter fork 4. This corresponds to a second gear ratio and deviates from the progressive pattern. In other words movement from neutral into first is in the same direction as movement from neutral into second although in a different plane. However, if it is desired to maintain the progressive shift pattern cam surface 64 on the inner surface of lever 32 can be rearranged to a position opposite that shown in FIG. 3. Similarly, the cam knob 60 on cam member 52 would be arranged at the top of the cam rather than at the bottom as shown. This rearrangement would result in a configuration similar to that shown for cam 50 and lever 30. In this way even though the selector shaft is rotated in a counter-clockwise direction the movement of the lever is reversed so that the desired gearshift ratio is achieved through a progressive pattern. Specifically, with the cam knob 58 and surface 64 rearranged, the second gear ratio is achieved with a movement of selector shaft 48 in the counter-clockwise direction, opposite to the clockwise direction, as had been the case before but consistent with a progressive schedule. Thus, regardless of the gear location for different gear ratios, the above system provides a method for achieving a progressive shift pattern.

Another advantage evolving from the configuration of the levers and cams is the relatively short shift schedule between gear shift ratios. This reduces the tolerances required and enhances "feel" for the operator in making the shifts between gear ratios.

In operation the system works in the following manner. Assuming the selector shaft is initially in a neutral or non-engaged position between first and reverse, the operator would initially grasp the shifting lever 116 and move it toward the first gear ratio, position 1 in FIG. 6, which causes the gear selector shaft 48 to rotate in a counter-clockwise direction and drive the first lever 34 forwardly, i.e., in the direction of shifter forks 4 and 6 on stationary rail 10. This in turn drives the shifter fork 8 to move the shifter mechanism into a position where the first gear ratio is achieved. In this position ball member 108 is engaged with recess 102c to achieve a detent in the first gear ratio position. Also at this time the pin 78 has engaged internal slot 72 in the first cam 54 to achieve the desired rotative movement of that cam. In this position one of the keys 84 is entirely out of engagement with the external cam slots 86, 88 and 90 while the second male key 82 is in engagement with two cam slots 86 and 88 to retain them in a position notwithstanding movement of the first cam 54. In this position of course the space between the two keys 82, 84 is registered with first cam 54 thereby allowing rotation of that cam upon actuation of selector shaft 48.

When it is desired to move progressively into second gear ratio as shown in FIG. 6, the shifting lever 116 is initially rotated back to the neutral position between the first and reverse gear ratios. During this motion the bias of the roller ball 108 is overcome moving it out of recess 102c and into recess 102a. The shift lever 116 is then reciprocated laterally to move the selector shaft to the next lateral position, a neutral position, between the gear ratios 2 and 3 as shown in FIG. 6. During this movement ball 108 is pushed upwardly out of recess 102a to a position where it rides on the surface between the sets of recesses 102 and 104. Simultaneously ball 110 moves into recess 106a. From this lateral position, the selector shaft can select either ratio 2 or 3 since the selector pin is in engagement with cam slot 74 in cam 52 as shown in FIG. 4. As also can be seen from FIG. 4, the keys 82, 84 are in engagement with the cams on either side of cam 52 to prevent them from movement during actuation of the selector shaft. The space between the keys registers with the selected cam 52 to provide for movement of that cam upon actuation of selector shaft 48. Movement of the selector shaft in a counter-clockwise direction results in a gear shift corresponding to the second gear ratio. Because of the interaction of the cam knob 58 with the complementary cam surface 64 in lever 32, the lever is moved rearwardly or toward shifter fork 8 thereby moving shifter fork 6 in the same direction, a direction which is opposite that of gear shifting lever 116 so that the progressive pattern can be made.

It should be noted that rotation of the selector shaft 48 from the neutral position to the first gear ratio, although in the opposite direction of movement in the second gear ratio as part of the progressive shift pattern, moves the shifter forks 6 and 8 in the same direction.

In shifting from the second gear ratio, corresponding to position 2 of FIG. 6, to the third gear ratio, corresponding to position 3 of FIG. 6, shifting lever 116 is moved to effect a clockwise rotation of selector shaft 48. Because pin 78 remains engaged with internal cam slot 74 of cam 52, the selector shaft rotative movement results in a corresponding rotation of cam 52 which in turn, through engagement of cam surface 64 in lever 68 by cam knob 58, moves lever 68 leftward toward shifter fork 4. This lever movement drives shifter fork 6 initially to a neutral position after disengagement with a gear corresponding to the second gear ratio and eventually engagement with a gear corresponding to the third gear ratio.

The operator will be provided with "feel" at both the neutral and the third positions during this shift operation because ball 110 will initially be moved out of recess 106c and into recess 106a, neutral, and finally into 106b, third position. The blocking mechanism operates in the same manner as described above with respect to the shift between neutral and the second position of FIG. 6 to prevent movement of the other cams 50, 54 and their respective levers 30, 34.

The shifting operation from third to fourth and fourth to fifth is a continuation of the progressive pattern and is substantially identical to that from first to second and second to third. Consequently, it suffices to say that the remaining shift actuation follows in a logical manner from that described above, since further explanation would be needlessly redundant.

It is claimed:

1. An apparatus for selecting a gear ratio for a transmission system comprising:
   a. a stationary rail;
   b. a plurality of shifter means mounted for longitudinal movement on said rail for effecting a change in gear ratio;

c. a selector shaft mounted for lateral movement along its axis and rotative movement about said axis;

d. a plurality of cams arranged for separate actuation by said selector shaft, a plurality of levers having respective cam surfaces, said cams having respective cam portions for engaging cam surfaces of corresponding ones of said levers;

e. said levers being arranged for separate actuation by corresponding ones of said cams, said levers being aligned with said shifting means for engagement with corresponding ones of said shifter means for longitudinally moving said shifter means; and f. said selector shaft including means for selectively engaging said cams and for moving the selected cam to effect movement of the corresponding lever.

2. The apparatus according to claim 1 wherein said means for selectively engaging said cams includes a slot in said cams, and a pin extending from said selector shaft for engaging said slots.

3. The apparatus according to claim 2 wherein said slot extends radially into its respective cam, said pin extending radially from said shaft for registering with a slot of a selected cam upon longitudinal movement of said selector shaft and for moving said selected cam upon rotative movement of said selector shaft.

4. The apparatus according to claim 1 or 3 including means for constraining said levers from rotative movement during rotation of said selector shaft.

5. The apparatus according to claim 4 including means for constraining said cams and levers from longitudinal movement during longitudinal movement of said selector shaft.

6. The apparatus according to claim 1 including blocking means for blocking movement of non-selected cams during actuation of a selected cam.

7. The apparatus according to claim 6 wherein said blocking means includes said cams having an external second slot extending into said cams, and male key members for extending into said external slot of non-selected cams during actuation of a selected cam.

8. The apparatus according to claim 1 including bias means for maintaining said selector shaft in a position corresponding to any gear ratio selection and neutral positions.

9. The apparatus according to claim 8 wherein said bias means includes recesses in said selector shaft corresponding to said gear ratio selection and neutral positions and a ball biased into said recesses by spring means.

10. The apparatus according to claim 1 wherein said levers have a plate configuration with a cavity for accommodating rotative movement of said cams; said cams also having a plate configuration.

11. The apparatus according to claim 10 wherein said levers and their respective cams are arranged adjacent one another for movement in parallel planes, and said selector shaft arranged for said movement along its longitudinal axis perpendicular to the movement of said levers and rotative movement parallel to the movement of said levers.

12. The apparatus according to claim 1 wherein said levers and cams are configured to maintain a progressive shift pattern regardless of direction of movement of said shifter means.

13. The apparatus according to claim 12 wherein said levers have a male-engaging portion and said corresponding shifter means have a complementary female portion for receiving said male engaging portion, said male engaging portion cooperating with said female portion for moving said shifter means along said rail;

said levers having internal surfaces and external surfaces, said cam surface being a recess in a said internal surface;

said cams having a knob for engaging said recess to effect movement of said lever upon actuation of said cams by said selector shaft;

said cams circumscribing said selector shaft; and said selector shaft having a shift lever extending therefrom for actuation by an operator.

14. An apparatus for selecting a gear ratio for a transmission system comprising:

(a) a rail;

(b) a plurality of shifter means movably mounted on said rail for effecting a change in gear ratio;

(c) a selector shaft mounted for lateral movement along its axis and rotative movement about said axis;

(d) a plurality of levers arranged for separate actuation by said selector shaft, said levers being positioned for engagement with corresponding ones of said shifter means to effect said movement of said shifter means on said rail;

(e) said selector shaft including means for selectively engaging said levers upon lateral movement of said selector shaft along said axis and actuating said levers upon rotative movement of said selector shaft about said axis to effect movement of an engaged lever;

(f) means for transposing rotative movement of selector shaft during actuation to linear movement of an engaged lever, said means of transposing rotative movement includes a housing defining an engaging surface, said lever defining a complementary surface for said engaging surface, said surfaces cooperating to react to movement imparted to said lever by said selector shaft actuation and prevent rotative movement while permitting linear movement; and (g) said means for selectively engaging and actuating said levers includes a plurality of cams corresponding to said levers, said cams defining a longitudinal slot substantially parallel to the longitudinal axis of said selector shaft, said selector shaft having a pin extending therefrom for engagement with said slot of said cams whereby lateral movement of said selector shaft selects one of said cams for actuation by locating a pin in said slot and rotation of said selector shaft causes said pin to rotate said cam and effect movement of said lever.

15. The apparatus according to claim 14 wherein said engaging surface is a substantial flat surface of an under portion of said housing, said complementary surface is a substantially flat surface on an external portion of said lever, and said lever being positioned for said complementary surface to engage said engaging surface of said housing to provide for a linear movement of said lever during actuation of said selector shaft.

16. An apparatus for selecting a gear ratio for a transmission system comprising:

(a) a rail;

(b) a plurality of shifter means movably mounted on said rail for effecting a change in gear ratio;

(c) a selector shaft mounted for lateral movement along its axis and rotative movement about said axis;

(d) a plurality of levers arranged for separate actuation by said selector shaft, said levers being positioned for engagement with corresponding ones of said shifter means to effect said movement of said shifter means on said rail;

(e) said selector shaft including means for selectively engaging said levers upon lateral movement of said selector shaft along said axis and actuating said levers upon rotative movement of said selector shaft about said axis to effect movement of an engaged lever;

(f) means for transposing rotative movement of said selector shaft during actuation to linear movement of an engaged lever;

(g) said levers being configured to maintain a progressive shift pattern regardless of direction of movement of said shifter means; and (h) said levers having a plate configuration with a cavity therein for accommodating rotative movement of cams, said cams having a plate configuration; said cams further defining a knob portion and said levers defining a recess open to said cavity within said lever; said levers and cams being arranged with respect to said selector shaft such that a lever and its corresponding cam can be replaced independently of other levers and corresponding cams to reverse lever movement for a selected rotation direction.

17. The apparatus according to claim 16 wherein said levers and their respective cams are arranged adjacent one another for movement in parallel planes, and said selector shaft is arranged for movement along its longitudinal axis perpendicular to the movement of said levers and rotative movement parallel to the movement of said levers.

18. The apparatus according to claim 16 including blocking means for blocking movement of nonselected levers during actuation of a selected lever.

* * * * *

UNITED STATES PATENT OFFICE
CERTIFICATE OF CORRECTION

Patent No. 4,335,623    Dated June 22, 1982

Inventor(s) Victor Kronstadt

It is certified that error appears in the above-identified patent and that said Letters Patent are hereby corrected as shown below:

Column 5, line 27, "92" should be --96--.

Column 5, line 68, "axit" should be --axis--.

Column 6, line 31, "146" should be --106--.

Column 6, line 31, "setw" should be --sets--.

Column 6, line 41, "houing" should be --housing--.

Signed and Sealed this

Twelfth Day of October 1982

[SEAL]

Attest:

Attesting Officer

GERALD J. MOSSINGHOFF

Commissioner of Patents and Trademarks